United States Patent [19]
Bloom et al.

[11] Patent Number: 5,213,911
[45] Date of Patent: May 25, 1993

[54] SOLID-OXIDE FUEL CELL ELECTROLYTE

[75] Inventors: Ira D. Bloom, Bolingbrook; Mark C. Hash, Joliet; Michael Krumpelt, Naperville, all of Ill.

[73] Assignee: The United States of America as represented by The United States Department of Energy, Washington, D.C.

[21] Appl. No.: 777,954

[22] Filed: Oct. 17, 1991

[51] Int. Cl.$^5$ ............................................. H01M 8/00
[52] U.S. Cl. ........................................ 429/33; 429/36; 429/104; 429/191; 429/193; 252/518
[58] Field of Search ................... 252/62.2, 521, 518; 429/33, 46, 191, 193, 104; 423/600, 604, 605, 606; 422/98

[56] References Cited

U.S. PATENT DOCUMENTS

| | | | |
|---|---|---|---|
| 4,314,996 | 2/1982 | Sekido et al. | 422/98 |
| 4,414,138 | 11/1983 | Petty et al. | 502/73 |
| 4,462,891 | 7/1984 | Lawless | 429/33 |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,477,541 | 10/1984 | Fraioli | 429/33 |

FOREIGN PATENT DOCUMENTS 201057 11/1983 Japan ..................................... 422/98

OTHER PUBLICATIONS

Journal of Applied Electrochemistry 2 (1972) 97-104, High Oxide Ion Conduction in Sintered $Bi_2O_3$ Containing SrO, CaO or $La_2O_3$, T. Takahashi et al.
Applied Physics A 50, 449-462 (1990), Yttria Tetragonal Zirconia Polycrystalline Electrolytes for Solid State Electrochemical Cells, S.P.S. Badwal.
Solid State Ionics 44 (1990) 21-31, Oxide-ion Conduction in $Ba_2In_2O_5$ and $Ba_3In_2MO_8$ (M=Ce, Hf, or Zr).
Journal of Solid State Chemistry, Crystal Chemistry Modulated Structure, and Electrical Conductivity in the Oxygen Excess Sheelite-Based Compounds $La_{1-x}Th_x NbO_{4+x/2}$ and $LaNb_{1-x}W_x O_{4+x/2}$, R. J. Cava, pp. 318-329.
Journal of Solid State Chemistry 29, 227-236 (1979), Electrical Conductivity and Defect Chemistry of $PbMoO_4$ and $PbWO_4$ J. A. Groenink et al.
Solid State Ionics 28-30 (1988) 529-532, Phase Transitions and Ionic Conductivity in $Bi_4V_2O_{11}$ an Oxide With a Layered Structure, F. Abraham, et al.

Primary Examiner—Paul Lieberman
Assistant Examiner—M. Kopec
Attorney, Agent, or Firm—Hugh W. Glenn; Robert J. Fisher; William R. Moser

[57] ABSTRACT

A solid-oxide electrolyte operable at between 600° C. and 800° C. and a method of producing the solid-oxide electrolyte are provided. The solid-oxide electrolyte comprises a combination of a compound having weak metal-oxygen interactions with a compound having stronger metal-oxygen interactions whereby the resulting combination has both strong and weak metal-oxygen interaction properties.

14 Claims, 2 Drawing Sheets

SOLID-OXIDE FUEL CELL ELECTROLYTE

CONTRACTUAL ORIGIN OF THE INVENTION

The United States has rights in this invention pursuant to contract No. W-31-109-ENG-38 between the United States Government and Argonne National Laboratory.

BACKGROUND OF THE INVENTION

1. Field of the Invention

This invention relates to high temperature ionic conductors for solid-oxide fuel cells and more particularly to a Bi-Al-O system that displays superior conductivity levels at temperatures between 500° C. and 800° C.

2. Background of the Invention

Solid-state oxide fuel cells (SOFC's) can become one of the most durable and economic fuel systems for utility and transportation applications. Using solid electrolytes virtually eliminates corrosion reactions and electrolyte losses that are common in liquid electrolyte fuel cells. Furthermore, fuel processing for SOFC's is simpler and less expensive than other types of fuel cells.

Presently, SOFC's operate at temperatures of approximately 1000° C. The requirement of high operating temperatures to obtain adequate conductivity levels limits the number of materials available for SOFC fabrication as most of the materials become compromised thermally, chemically and mechanically under these high temperature conditions. For example, the conductivity of the commonly used yttrium-stabilized zirconium oxide is $10^{-1}$ ohm$^{-1}$ cm$^{-1}$ at 1000° C. This conductivity decreases to $4 \times 10^{-2}$ ohm$^{-1}$ cm$^{-1}$ at 800° C. Examples of yttria-stabilized zirconia electrolytes used at high temperatures can be found in U.S. Pat. Nos. 4,476,196; 4,476,197 and 4,476,198, wherein the electrolytes facilitate ion transfer in electrochemical fuel cells operating in temperatures exceeding 1000° C. As with the above-mentioned teachings, most fuel cells incorporating the yttria-stabilized zirconia also rely on standard materials such as zirconia-based cermet and $LaMnO_3$ as constituents for the accompanying electrodes.

Operating an SOFC at more moderate temperatures, such as 600°-800° C., would allow much greater flexibility in engineering the fuel stack because metals could be used as interconnect and gasket materials. This would ultimately reduce the cost and open up new applications. With the present technology, it is not possible to lower the operating temperature of the fuel cell because the electrical resistance of the electrolyte increases exponentially as temperature decreases. To decrease the operating temperature, a new electrolyte must be found.

New electrolytes have been produced which provide superior conductance at temperatures ranging from 500°-800° C. The materials are selected and produced based on an observed relationship between the conductivity of a material and the metal-oxygen interaction strength in the material.

SUMMARY OF THE INVENTION

It is an object of the present invention to provide a class of electrolytes that overcomes many of the disadvantages of prior art arrangements.

It is another object of the present invention to provide a class of electrolytes for use in utility and transportation applications. A feature of the present class of electrolytes is their use at temperatures of between approximately 500° C. and 800° C. An advantage of the present invention is the ability to now incorporate a wider range of materials in the fabrication of solid-oxide fuel cells.

Still another object of the present invention is to provide a highly conductive electrolyte to operate at temperatures below 1000° C. A feature of the invention is the combination of compounds having weak intramolecular metal-oxygen interactions with compounds having relatively stronger intramolecular metal-oxygen interactions. An advantage of the present invention is that the resulting material has a relatively larger Gibbs free energy of formation than the more standard electrolytes now in use, leading to a more conductive electrolyte material.

Yet another object of the present invention is to provide materials that are more conductive than standard yttria-stabilized zirconium oxides. A feature of the invention is that the constituents of the invented electrolytes have properties concomitant with both strong and weak metal-oxygen interactions. The advantage of the invention is that the electrolytes represent a compromise between the high thermodynamic stability of refractory metal oxides, such as alumina, and the high ionic conductivity of reducible oxides, such as $Bi_2O_3$.

In brief, the objects and advantages of the present invention are achieved by a solid-oxide electrolyte. The electrolyte is comprised of a combination of a compound having weak metal-oxygen interactions with a compound having strong metal-oxygen interactions whereby the resulting combination has properties indicative of both strong and weak metal-oxygen interactions. The invention also provides a method of fabricating solid-oxide electrolytes comprised of a combination of a compound having weak metal-oxygen interactions with a compound having strong metal-oxygen interactions whereby the resulting combination has properties indicative of both strong and weak metal-oxygen interactions. Such materials can be used in fuel cells, sensors, batteries and other electrochemical devices.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE INVENTION

Figure 1:
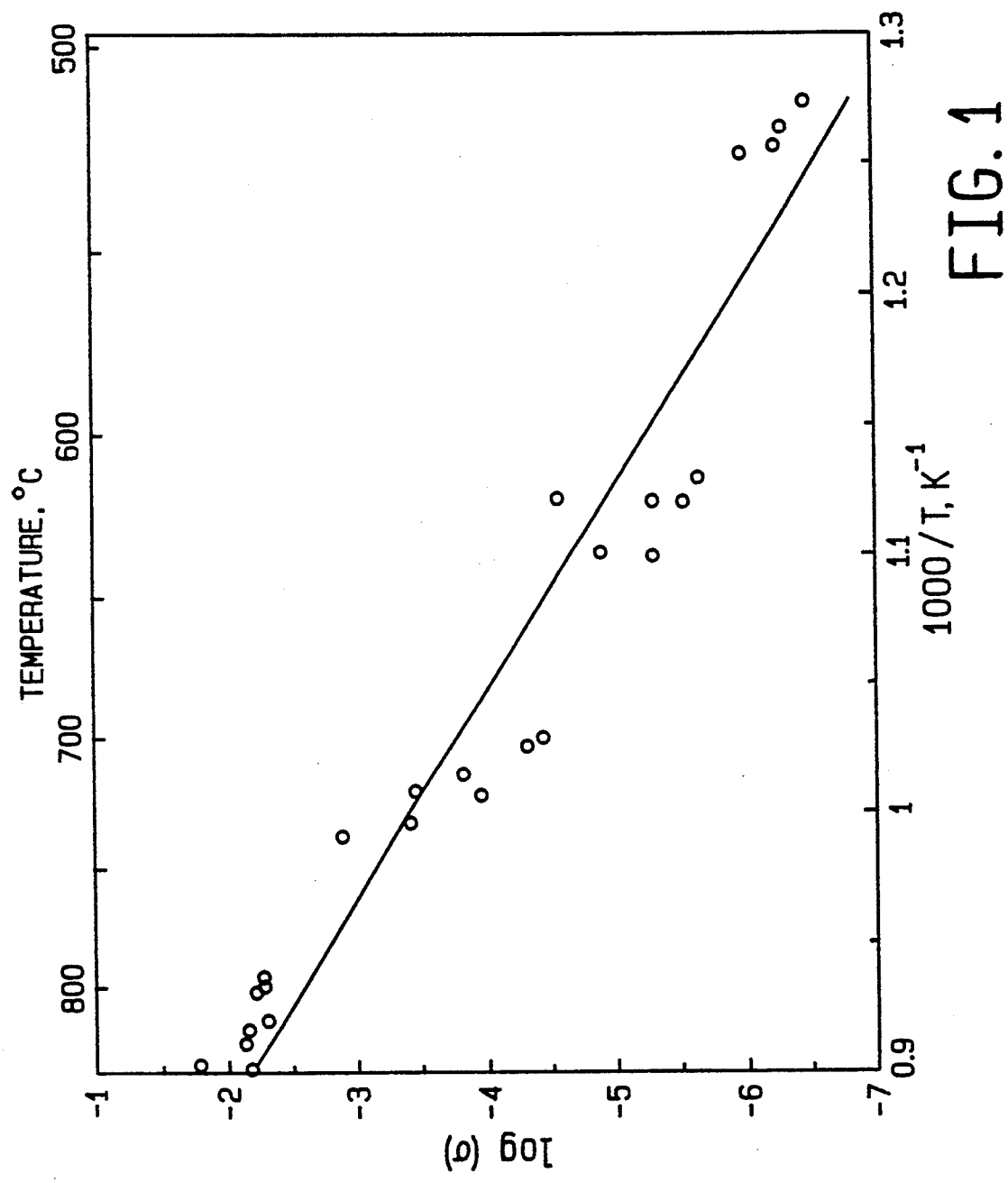
FIG. 1 is an Arrhenius plot depicting the variation of conductivity with temperature for an exemplary electrolyte having the general formula $Bi_2Al_4O_9$ of the present invention.

The new electrolytes of the present invention described herein operate at temperatures ranging from 500°-800° C. to provide conductivities higher than presently used solid-oxide electrolytes operating at similar temperatures.

The invention centers around the selection of electrolyte materials having phases containing both strong and weak metal-oxygen interactions. The addition of compounds with a stronger metal-oxygen bond serves to add chemical stability towards hydrogen and oxygen at elevated temperatures which are environs in which the fuel cell operates.

Conductivity of the invented electrolytes can be measured by ac impedance spectroscopy in either air or in a humidified hydrogen/oxygen cell, the latter serving to mimic fuel stack conditions. Also, by measuring the electromotive force between the two electrodes and humidified hydrogen/oxygen and comparing the experimental to the theoretical values, the ionic transference number can be determined as additional assurance that the conductivity occurring is ionic and not electronic. Unity is the theoretical value depicting a one to one ion transfer through the electrolyte.

Material Types

Materials used as the electrolyte in the invention represent many compound systems, including Bi-M-O (wherein M is one or more metals), Re-M-O (wherein RE is a rare earth and M is one or more metals), and La-M-O (wherein M is one or more metals). These systems were chosen based on an observed inversely proportional relationship between the conductivity of material fabricated from compounds representing the system and the metal-oxygen interaction strength in the material. Interaction strength was gauged with model reactions using the end-member oxides, such as those illustrated in Equations 1 and 2, below:

$$M_xO_y + H_2 \rightarrow M_xO_{y-1} + H_2O \qquad \text{Eq. 1}$$

$$M_xO_y + yH_2 \rightarrow xM + yH_2O \qquad \text{Eq. 2}$$

This invention exploits the classical thermodynamic phenomenon wherein the standard free energy of formation of a compound, $\Delta G_f^\circ$, is a measure of the stability of the substance. If a compound has a large negative value of $\Delta G_f^\circ$, the compound cannot be readily decomposed into its elements. Rather, that compound is likely to be formed as a product in any reaction in which its constituent elements are involved. Conversely, a compound with a relatively more positive $\Delta G_f 20$ is more unstable and has a tendency to decompose into its elements.

Thus, the inventors have observed that oxides with a more positive $\Delta G_f^\circ$ tend to be more conductive. For example, yttria-doped $ZrO_2$, with the lowest $\Delta G_f^\circ$ value is the least conductive and yttria-doped $Bi_2O_3$, with the highest $\Delta G_f^\circ$ value is the most conductive. These trends are depicted in Table 1, below:

TABLE 1

| ΔG values of formation and conductivities for selected metal oxides. | | |
|---|---|---|
| Material (Y-doped) | $\Delta G_f^\circ$/mol $O_2$ at 727° C., kcal/mol | Conductivity $\Omega^{-1}$ cm$^{-1}$ at 700° C. |
| $ZrO_2$ | −220 | $1.8 \times 10^{-2}$ |
| $CeO_2$ | −208 | $2.5 \times 10^{-2}$ |
| $Bi_2O_3$ | −58 | $1.6 \times 10^{-1}$ |

Yttrium-, erbium-, and niobium-doped $Bi_2O_3$ are known to be excellent oxide ion conductors in the temperature range of 500°-800° C. However, these doped bismuth oxides are easily reduced in hydrogen. Ideally, an electrolyte should display high conductivity characteristics and good stability in fuel cell environments which are laden with $H_2$ and $O_2$.

Surprisingly and unexpectedly, it has been found that when compounds having weak metal-oxygen interactions, such as $Bi_2O_3$, transition metal oxides, and rare earth metal oxides are combined with compounds having stronger metal-oxygen interactions, such as $Al_2O_3$, $Y_2O_3$, $La_2O_3$, and alkaline earth oxides, or when $Bi_2O_3$ is incorporated in a refractory host lattice, a more stable and conductive electrolyte is obtained.

When the reducible oxide $Bi_2O_3$ is combined with more stable refractory metal oxides, for example, the newly formed compound is more stable in hydrogen than doped bismuth oxide and also exhibits higher conductivity than any of the more stable metal oxides enumerated above.

The invented electrolytes cannot be categorized into any one structural class, although many structural classes, one being the perovskites, can be represented by the invention. Electrolytes were produced representing many systems, including Bi-M-O (wherein M is one or more metals), RE-M-O (wherein RE is a rare earth and M is one or more metals), and La-M-O (wherein M is one or more metals). Examples of the invented electrolytes include, but are not limited to, $BiAlO_3$, $Bi_2Al_4O_9$, $BiYO_3$, $La_{0.33}NbO_3$, La-M-Bi-Al-O wherein M is a metal, $La_{0.8}Bi_{0.1}Ba_{0.1}AlO_{3-x}$ wherein x is the oxygen content of the various oxides used in combination to make the compound, $La_{0.7}Bi_{0.315}Al_{0.95}Zn_{0.05}O_{3-x}$ wherein x is the oxygen content of the various oxides used in combination to make the compound, $La_{0.6}Bi_{0.4}Al_{0.95}Zn_{0.05}O_{2.975}$, and $M_2LnBiO_6$ wherein the M is an alkaline earth and Ln is a rare earth. Obviously, the x-value will change for any of the compounds enumerated above if oxidation states for some of the metals, such as Bi and Zn, change. For example, in the compound $La_{0.8}Bi_{0.1}Ba_{0.1}AlO_{3-x}$, the 3−x value is 2.95, assuming an oxidation state for Bi of +3. If this +3 oxidation state changes, the x-value will correspondingly change.

Any of the alkaline earth metals can be used in the electrolyte structure, such as Mg, Ca, Sr, and Ba. A myriad of rare earths are acceptable, including, but not limited to, La, Gd, Dy, Ho, Er and Lu.

To illustrate that the oxide-ion conductivity of a material is affected by the strength of the metal-oxygen bonds, an electrolyte was produced by starting with $Bi_2O_3$, which has weak, easily reducible metal-oxygen bonds, and then strengthening the bonds by adding another material with very strong metal-oxygen bonds, such as $Al_2O_3$. The combination, in approximately a 1:2 molar ratio, yielded $Bi_2Al_4O_9$. In an oxygen gradient, the conductivity of this material at 800° C. was $5-8 \times 10^{-3}$ ohm$^{-1}$cm$^{-1}$, with transference numbers in the 0.6 to 0.7 range. At 800° C. the combination had conductivity values of $7-9 \times 10^{-2}$ ohm$^{-1}$cm$^{-1}$. FIG. 1 depicts the increase in conductivity values as a function of temperature for bismuth-containing compounds.

$Bi_2Al_4O_9$ is different from other $Bi_2O_3$ materials in that the amount of $Al_2O_3$ used is far above the so-called "doping" level. Furthermore, $Bi_2Al_4O_9$ represents a compromise between the high conductivity, relatively unstable, low Gibbs free energy $Bi_2O_3$ species and the low conductivity, highly stable $Al_2O_3$.

Fabrication Methods

Two methods are employed to make the electrolyte combinations discussed above: combustion of a solution of metal nitrates, known as the glycine-nitrate process; and a solid state reaction of oxides which is a process of substituting, for example, the Bi-based ceramic into a refractory host lattice. The glycine-nitrate process provides the synthetic step of producing pre-calcined powders wherein an aqueous solution of the metal nitrate and glycine first undergoes evaporation and is then combusted. A more complete disclosure of the process can be found in *Materials Letters* 10:6, 1990, and is incorporated herein by reference.

Bi-Al-O Perovskite System Fabrication: Practically, pellets of the perovskite $BiAlO_3$ are difficult to make due to peritectic decomposition, and also because of the presence of the orthorhombic phase, $Bi_2Al_4O_9$. Conversely, phase-pure samples of $Bi_2Al_4O_9$ could not be sintered into dense pellets. Instead, an approximately six mole percent of $Bi_2O_3$ was combined with $Bi_2Al_4O_9$ via the glycine-nitrate process, and then formed into pellets. After calcining and sintering this material, at 800° C. and 975° C., respectively, the pellets were characterized by AC impedance spectroscopy in an oxygen gradient. These pellets had a density of 93-96%.

Calcining temperatures can range from 400° C. to 800° C. Calcining times are a matter of convenience but typically require at least an hour. Calcining overnight is not atypical. Sintering temperatures vary widely, depending on the material being treated. Such temperatures can be as high as 1650° C. for La-Al-O compounds. For Bi-Al-O compounds, sintering temperatures range from 975° C. to just below the decomposition temperature of 1080° C.

Alternative methods were tried in an effort to make better quality powder and purer 1:1 material. Pellets made by solution methods were white to pastel yellow in color; when made by solid-state methods, they were orange.

La-Al-O Perovskite System Fabrication: Another method to gain thermodynamic stability in electrolytes is to substitute materials having weak metal-oxygen interactions, such as Bi-based ceramics, into a refractory host lattice exhibiting stability at high temperatures and in environments ladened with $H_2$ and $O_2$. A requirement here is a host metal site that is large enough to incorporate the reducible metal center. For example, $LaAlO_3$ is an ionic conductor when doped with divalent cations. As such, this refractory oxide is a good choice as an electrolyte lattice when combined with Bi.

Figure 2:
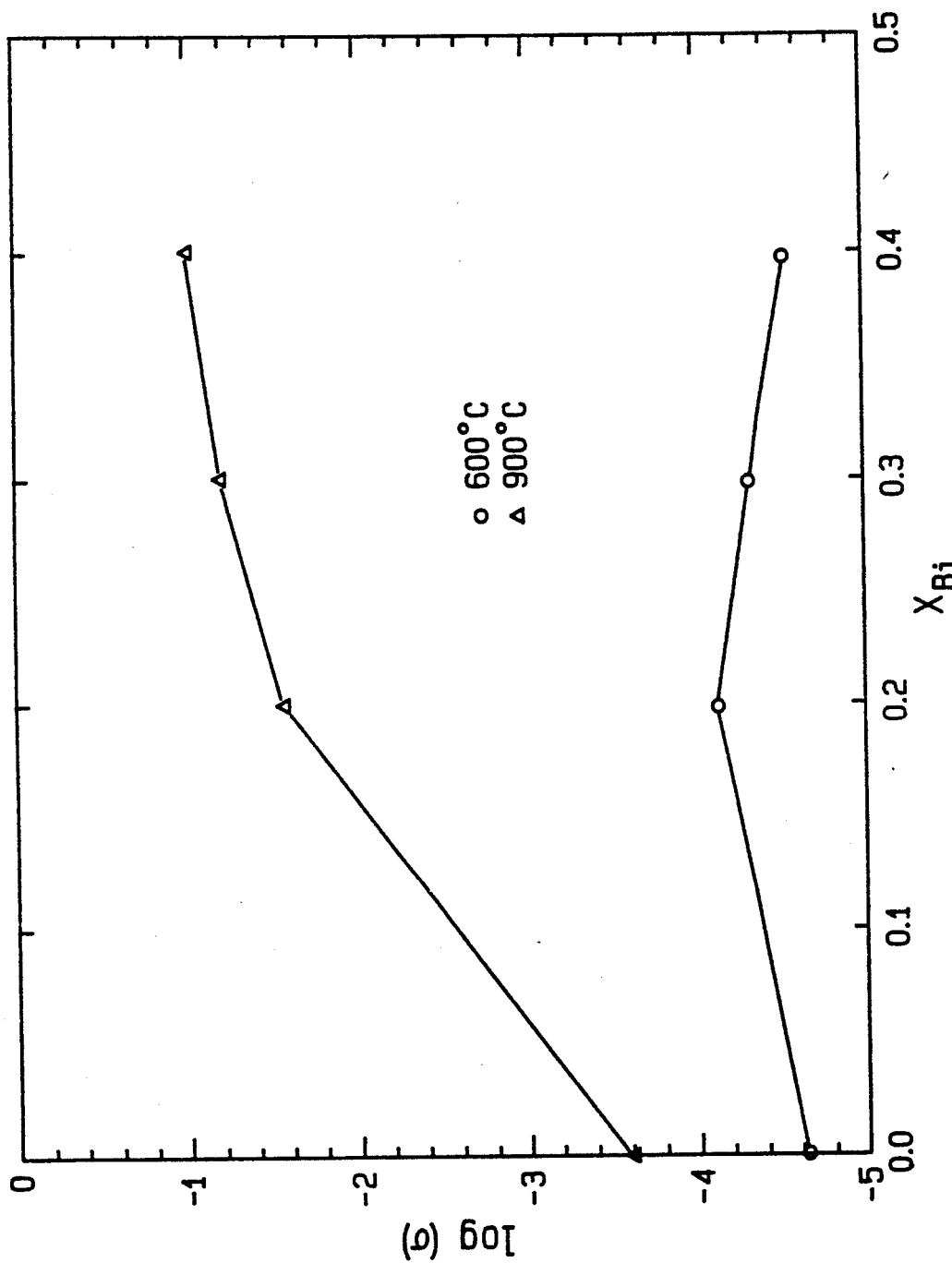
FIG. 2 is a plot depicting the comparison between the log of conductivity and bismuth content for an exemplary electrolyte having the general formula $(La,Bi)AlO_3$ of the present invention.

The following compound was produced:

$$La_{1.0-x}Bi_xAlO_3$$

where x ranges from 0 to 0.4. These powders were produced via the glycine-nitrate process with bismuth added in the synthetic step. Sintered pellets produced from these powders were tested for conductivity in an oxygen gradient (0.1% v. 100%). At 800° C., ionic transference numbers for these materials were approximately 0.50. At temperatures greater than 750° C., the compositions with higher Bi concentrations were more highly conductive; at temperatures lower than 750° C., the conductivity decreased as x increased from 0.2 to 0.4. These trends are illustrated in FIG. 2. A least-squares analysis of the data show an increase in the activation energy and an increase in the preexponential factor of the Arrhenius equation with increasing Bi content.

Another La-Al-O perovskite produced has the formula $La_{0.8}Bi_{0.1}Ba_{0.1}AlO_{3-x}$ with a density 58.8% of the theoretical value, and wherein x represents the oxygen content of the various other metal oxides combined to produce the material. This material was prepared by dissolving $La_2O_3$, $Bi(NO_3)_3 \cdot 5H_2O$, $Ba(NO_3)_2$ and $Al(NO_3)_3 \cdot 9H_2O$ in concentrated $HNO_3$. The water was evaporated from the solution, and the resultant solid was calcined for 10 hours at 500° C. The calcined material was milled to reduce particle size. A pellet was pressed and sintered according to the following thermal profile: 1200° C. for 10 hours, 1600° C. for 10 hours, and 1650° C. for 16 hours. The conductivity results are given in Table 2.

TABLE 2

| Conductivity values from $La_{0.8}Bi_{0.1}Ba_{0.1}AlO_{3-x}$ | |
|---|---|
| Temperature °C. | Conductivity $\Omega^{-1} cm^{-1}$ |
| 560 | $1.40 \times 10^{-6}$ |
| 660 | $1.67 \times 10^{-5}$ |
| 760 | $5.50 \times 10^{-5}$ |
| 860 | $1.22 \times 10^{-4}$ |

La-Al-O perovskites containing bismuth and zinc yielded exceptionally good conductivity rates, as depicted in Tables 3 and 4 below.

TABLE 3

| Conductivity values from $La_{0.7}Bi_{0.315}Al_{0.45}Zn_{0.05}O_{3-x}$ | |
|---|---|
| Temperature °C. | Conductivity $\Omega^{-1} cm^{-1}$ |
| 505 | $2.6 \times 10^{-5}$ |
| 603 | $2.8 \times 10^{-4}$ |
| 693 | $2.6 \times 10^{-3}$ |
| 790 | $8.0 \times 10^{-2}$ |
| 795 | $9.6 \times 10^{-2}$ |
| 799 | $1.4 \times 10^{-1}$ |
| 802 | $1.1 \times 10^{-1}$ |
| 805 | $1.6 \times 10^{-1}$ |

TABLE 4

| Conductivity values from $La_{0.6}Bi_{0.4}Al_{0.95}Zn_{0.05}O_{2.975}$ | |
|---|---|
| Temperature °C. | Conductivity $\Omega^{-1} cm^{-1}$ |
| 495 | $1.80 \times 10^{-5}$ |
| 603 | $2.09 \times 10^{-4}$ |
| 700 | $9.25 \times 10^{-4}$ |
| 750 | $4.00 \times 10^{-3}$ |
| 800 | $1.17 \times 10^{-1}$ |
| 850 | $3.04 \times 10^{-1}$ |
| 898 | $3.44 \times 10^{-1}$ |

La-M-O Perovskite System Fabrication: $La_{0.33}NbO_3$ was obtained by milling $La(OH)_3$ and $Nb_2O_5$ together and calcining for 10 hours at 1175° C. for 10 hours. The geometric density of the pellet was 84% of theoretical density. Table 5 contains the conductivity data for this material.

Measurements of the ionic transference numbers were obtained using 100% $O_2$ in one compartment and 0.01% $O_2$ (balance inert) in the other.

TABLE 5

| Conductivity values from $La_{0.33}NbO_3$ in 0.01% $O_2/100\% O_2$ | |
|---|---|
| Temperature °C. | Conductivity $\Omega^{-1} cm^{-1}$ |
| 503 | $9.18 \times 10^{-6}$ |
| 600 | $2.52 \times 10^{-5}$ |
| 699 | $1.05 \times 10^{-4}$ |
| 801 | $5.26 \times 10^{-4}$ |
| 896 | $1.58 \times 10^{-3}$ |

TABLE 5-continued

Conductivity values from $La_{0.33}NbO_3$ in 0.01% $O_2$/100% $O_2$

| Temperature °C. | Conductivity $\Omega^{-1} cm^{-1}$ |
|---|---|
| 996 | $5.69 \times 10^{-3}$ |

While the invention has been described with reference to details of the illustrated embodiments, these details are not intended to limit the scope of the invention as defined in the appended claims.

The embodiment of the invention in which an exclusive property or privilege is claimed is defined as follows:

1. A solid-oxide electrolyte which is substantially free of the ability to conduct electrons and is chemically stable to H2 in a fuel cell or battery operating environment comprising:
   a compound having weak metal-oxygen interactions; and
   a compound having stronger metal-oxygen interactions combined with said compound having weak metal-oxygen interactions, whereby the resulting combination has both strong and weak metal-oxygen interaction properties for providing increased thermodynamic stability and having a minimum ionic conductivity at 800° C. of $1 \times 10^{-1}$ ohm$^{-1}$ cm$^{-1}$; and wherein the resulting combination is selected from the general compound group consisting of Bi-M-O, RE-M-O wherein RE is a rare earth, La-M-O, and combinations thereof, and wherein M is one or more metals selected from the group of metals consisting of Al, Y, La, Bi, rare earths, alkaline earths, and transition metals, provided the resulting compound shall contain at least two different metals from said group.

2. A solid-oxide electrolyte as recited in claim 1 wherein the resulting combination is a perovskite.

3. A solid-oxide electrolyte as recited in claim 1, wherein the resulting combination is selected from the group consisting of $BiAlO_3$, $Bi_2Al_4O_9$, $BiYO_3$, $La_{0.7} Bi_{0.315} Al_{0.95} Zn_{0.05} O_{3-x}$ wherein x is the oxygen content of the compounds, used, $La_{0.6} Bi_{0.4} Al_{0.95} Zn_{0.05} O_{2.975}$, $M_2LnBiO_6$ wherein M is an alkaline earth and Ln is a rare earth, and combinations thereof.

4. A solid-oxide electrolyte as recited in claim 1 wherein the solid-oxide electrolyte exhibits a density of more than approximately 90%.

5. A method of fabricating solid-oxide electrolyte compounds which are substantially free of the ability to conduct electrons and are chemically stable to H2 in a fuel cell or battery operating environment comprising:
   selecting a compound having weak metal-oxygen interactions; and
   combining a compound having stronger metal-oxygen interactions with said compound having weak metal-oxygen interactions, whereby the resulting combination has both strong and weak metal-oxygen interaction properties for providing increased thermodynamic stability and having a minimum ionic conductivity at 800° C. of $1 \times 10^{-1}$ ohm$^{-1}$cm$^{-1}$; and wherein the resulting combination is selected from the general compound group consisting of Bi-M-O, RE-M-O wherein RE is a rare earth, La-M-O, and combinations thereof, and wherein M is one or more metals selected from the group of metals consisting of Al, Y, La, Bi, rare earths, alkaline earths, and transition metals, provided the resulting compound shall contain at least two different metals from said group.

6. A method as recited in claim 5 wherein the resulting combination is a perovskite.

7. A method as recited in claim 5 wherein the resulting combination is selected from the group consisting of $BiAlO_3$, $Bi_2Al_4O_9$, $BiYO_3$, $La_{0.7} Bi_{0.315} Al_{0.95} Zn_{0.05} O_{3-x}$ wherein x is the oxygen content of the compounds, used, $La_{0.6} Bi_{0.4} Al_{0.95} Zn_{0.05} O_{2.975}$, $M_2LnBiO_6$ wherein the M is an alkaline earth and Ln is a rare earth, and combinations thereof.

8. A method as recited in claim 7 wherein the alkaline earth is selected from the group consisting of Be, Mg, Ca, Sr, Ba and Ra.

9. A method as recited in claim 7 wherein the rare earth is selected from the group consisting of La, Gd, Dy, Ho, Er, Lu and combinations thereof.

10. A method as recited in claim 5 wherein the solid-oxide electrolyte exhibits a density of more than approximately 90%.

11. A method as recited in claim 5 wherein the step of combining the compound having weak metal-oxygen interactions with the compound having stronger metal-oxygen interactions further comprises the steps of
    a) calcining the shaped combination at a first predetermined temperature and time; and
    b) sintering the said calcined shaped combination at a second predetermined temperature and time.

12. A method as recited in claim 11 wherein the first predetermined temperature is between approximately 400° C. and 800° C. and the first predetermined time is between approximately 1 hour and 12 hours.

13. A method as recited in claim 11 wherein the second predetermined temperature is between approximately 900° C. and 1700° C. and the second predetermined time is between approximately 30 minutes and 20 hours.

14. A battery or fuel cell having an anode and a cathode separated by a solid oxide electrolyte compound substantially free of the ability to conduct electrons and chemically stable in $H_2$, said electrolyte comprising:
    a compound having weak metal-oxygen interactions; and
    a compound having stronger metal-oxygen interactions combined with said compound having weak metal-oxygen interactions, whereby the resulting combination has both strong and weak metal-oxygen interaction properties for providing increased thermodynamic stability and having a minimum ionic conductivity at 800° C. of $1 \times 10^{-1}$ ohm$^{-1}$ cm$^{-1}$; and wherein the resulting combination is selected from the general compound group consisting of Bi-M-O, RE-M-O wherein RE is a rare earth, La-M-O, and combinations thereof, and wherein M is one or more metals selected from the group of metals consisting of Al, Y, La, Bi, rare earths, alkaline earths, and transition metals, provided the resulting compound shall contain at least two different metals from said group.

* * * * *